(12) United States Patent
Vassilovski et al.

(10) Patent No.: US 11,626,017 B2
(45) Date of Patent: Apr. 11, 2023

(54) METHODS AND APPARATUS FOR PARKING LOT EXIT MANAGEMENT USING V2X

(71) Applicant: QUALCOMM Incorporated, San Diego, CA (US)

(72) Inventors: Dan Vassilovski, Del Mar, CA (US); Gene Wesley Marsh, San Diego, CA (US); Deviprasad Putchala, San Diego, CA (US); Shailesh Patil, San Diego, CA (US)

(73) Assignee: QUALCOMM incorporated, San Diego, CA (US)

( * ) Notice: Subject to any disclaimer, the term of this patent is extended or adjusted under 35 U.S.C. 154(b) by 0 days.

(21) Appl. No.: 16/889,469

(22) Filed: Jun. 1, 2020

(65) Prior Publication Data
US 2021/0375134 A1 Dec. 2, 2021

(51) Int. Cl.
*G08G 1/0967* (2006.01)
*G08G 1/09* (2006.01)

(52) U.S. Cl.
CPC ....... *G08G 1/096783* (2013.01); *G08G 1/093* (2013.01)

(58) Field of Classification Search
CPC .......... G08G 1/096783; G08G 1/093
See application file for complete search history.

(56) References Cited

U.S. PATENT DOCUMENTS

| 2011/0054739 A1* | 3/2011 | Bammert | B62D 15/0285 701/41 |
| 2013/0066690 A1 | 3/2013 | Echanove Hernandez | |
| 2017/0178172 A1* | 6/2017 | Balasubramanian | G08G 1/0129 |
| 2018/0276919 A1* | 9/2018 | Murata | G07B 15/00 |
| 2020/0105136 A1* | 4/2020 | Inoshita | G08G 1/133 |
| 2020/0302791 A1* | 9/2020 | Yamane | G08G 1/145 |

(Continued)

FOREIGN PATENT DOCUMENTS

| JP | 2009020616 A | 1/2009 |
| JP | 5007262 B2 | 8/2012 |
| JP | 2020027475 A | 2/2020 |

OTHER PUBLICATIONS

Ferreira, M., et al., "Self-Automated Parking Lots for Autonomous Vehicles Based on Vehicular Ad Hoc Networking", 2014 IEEE Intelligent Vehicles Symposium Proceedings, IEEE, Jun. 8, 2014 (Jun. 8, 2014), XP032620343, pp. 472-479, DOI: 10.1109/IVS.2014.6856561 [retrieved on Jul. 15, 2014] Abstract Section "V. Results".

(Continued)

*Primary Examiner* — Mohamed Barakat
(74) *Attorney, Agent, or Firm* — Danai Nelisile Mhembere; ArentFox Schiff LLP

(57) ABSTRACT

Aspects of the present disclosure include methods, apparatuses, and computer readable media for receiving a plurality of requests, from a plurality of user equipments (UEs), to exit a parking area comprising a plurality of vehicles, wherein each of the plurality of UEs is associated with a corresponding vehicle of the plurality of vehicles, determining an exit order for the plurality of vehicles to exit the parking area, and transmitting, to the plurality of UEs, a plurality of exit commands, based on the exit order, for the plurality of vehicles to exit the parking area.

26 Claims, 7 Drawing Sheets

(56) References Cited

U.S. PATENT DOCUMENTS

2020/0311783 A1* 10/2020 Noguchi ................ G06Q 10/02
2020/0365026 A1* 11/2020 Noguchi ............ G01C 21/3685

OTHER PUBLICATIONS

International Search Report and Written Opinion—PCT/US2021/030714—ISA/EPO—Aug. 18, 2021.
Nunes, R., et al., "Using Exit Time Predictions to Optimize Self Automated Parking Lots", 17th International IEEE Conference on Intelligent Transportation Systems (ITSC), IEEE, Oct. 8, 2014 (Oct. 8, 2014), XP032685814, pp. 302-307, DOI: 10.1109/ITSC.2014.6957708 [retrieved on Nov. 14, 2014] Abstract Especially Sentence Before Bottom Paragraph, p. 302, Right-Hand Column.

* cited by examiner

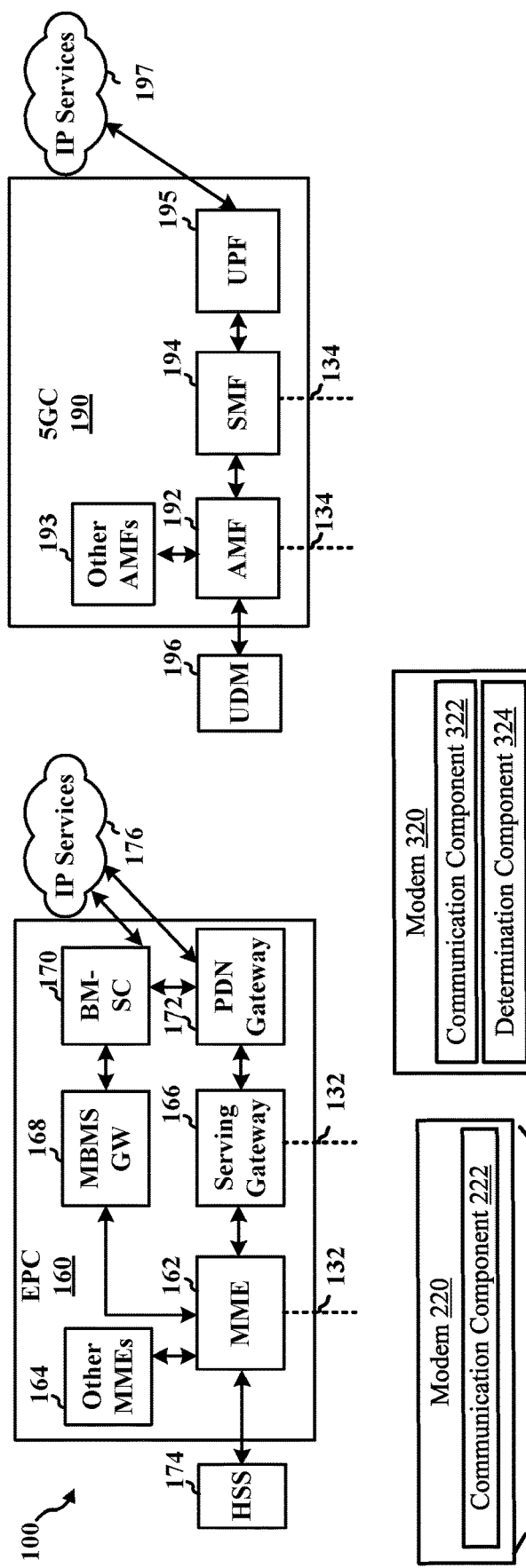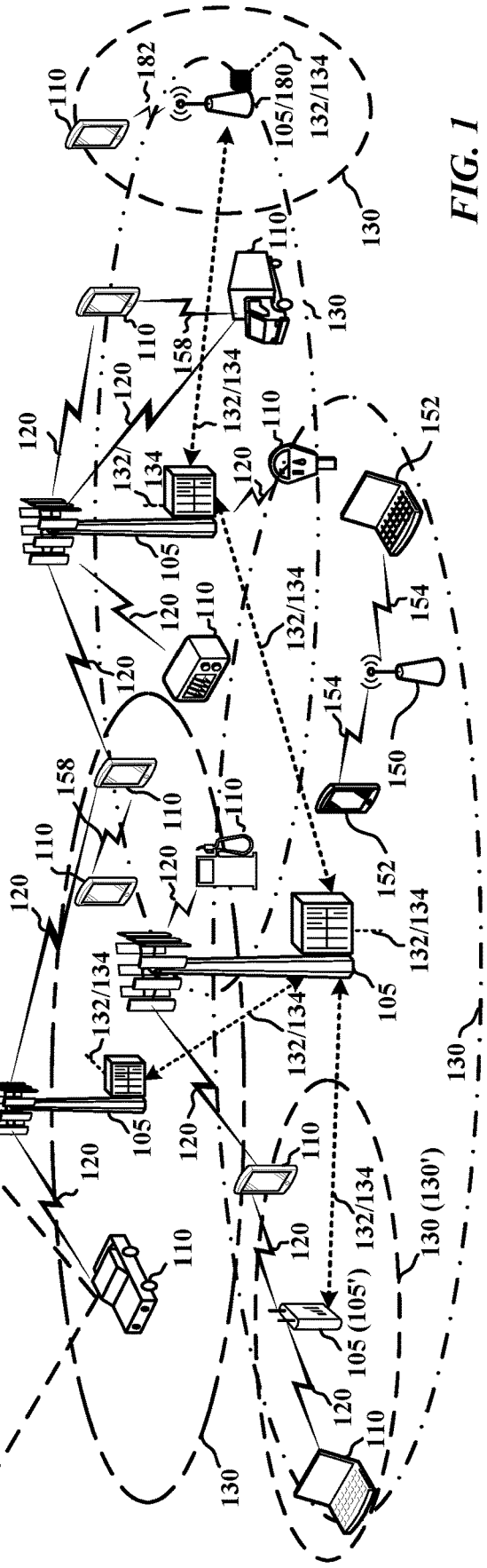
FIG. 1

METHODS AND APPARATUS FOR PARKING LOT EXIT MANAGEMENT USING V2X

BACKGROUND

Aspects of the present disclosure relate generally to wireless communications, and more particularly, to apparatuses and methods for parking lot exit management using V2X.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a vehicle-to-everything (V2X) network, multiple vehicles attempting to leave a parking area within a time frame (e.g., after a sporting event, end of a school day, shift change, etc.) may encounter congestion. It may be confusing for the drivers and/or autonomous vehicles to determine the order to exit the parking area and/or the optimum exit location. Therefore, improvements may be desirable to leverage the V2X network to manage the traffic and/or reduce congestions.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods by a road side unit for receiving a plurality of requests, from a plurality of user equipments (UEs), to exit a parking area comprising a plurality of vehicles, wherein each of the plurality of UEs is associated with a corresponding vehicle of the plurality of vehicles, determining an exit order for the plurality of vehicles to exit the parking area, and transmitting, to the plurality of UEs, a plurality of exit commands, based on the exit order, for the plurality of vehicles to exit the parking area.

Other aspects of the present disclosure include a road side unit having a memory comprising instructions, a transceiver, and one or more processors operatively coupled with the memory and the transceiver, the one or more processors configured to execute instructions in the memory to receive a plurality of requests, from a plurality of user equipments (UEs), to exit a parking area comprising a plurality of vehicles, wherein each of the plurality of UEs is associated with a corresponding vehicle of the plurality of vehicles, determine an exit order for the plurality of vehicles to exit the parking area, and transmit, to the plurality of UEs, a plurality of exit commands, based on the exit order, for the plurality of vehicles to exit the parking area.

An aspect of the present disclosure includes a road side unit including means for receiving a plurality of requests, from a plurality of user equipments (UEs), to exit a parking area comprising a plurality of vehicles, wherein each of the plurality of UEs is associated with a corresponding vehicle of the plurality of vehicles, means for determining an exit order for the plurality of vehicles to exit the parking area, and means for transmitting, to the plurality of UEs, a plurality of exit commands, based on the exit order, for the plurality of vehicles to exit the parking area.

Some aspects of the present disclosure include non-transitory computer readable media having instructions stored therein that, when executed by one or more processors of a road side unit, cause the one or more processors to receive a plurality of requests, from a plurality of user equipments (UEs), to exit a parking area comprising a plurality of vehicles, wherein each of the plurality of UEs is associated with a corresponding vehicle of the plurality of vehicles, determine an exit order for the plurality of vehicles to exit the parking area, and transmit, to the plurality of UEs, a plurality of exit commands, based on the exit order, for the plurality of vehicles to exit the parking area.

Aspects of the present disclosure include methods by a user equipment (UE) for transmitting, to a road side unit (RSU), an exit request, and receiving, from the RSU, at least one of a first exit command including an indication for the vehicle to begin exiting a parking area, a second exit command comprising identification information associated with another vehicle scheduled to exit the parking area immediately before the vehicle, or a third exit command comprising the exit time scheduled for the vehicle prior to the exit time.

Other aspects of the present disclosure include a user equipment (UE) having a memory comprising instructions, a transceiver, and one or more processors operatively coupled with the memory and the transceiver, the one or more processors configured to execute instructions in the memory to transmit, to a road side unit (RSU), an exit request, and receive, from the RSU, at least one of a first exit command including an indication for the vehicle to begin exiting a parking area, a second exit command comprising identification information associated with another vehicle scheduled to exit the parking area immediately before the vehicle, or a third exit command comprising the exit time scheduled for the vehicle prior to the exit time.

An aspect of the present disclosure includes a user equipment (UE) including means for transmitting, to a road side unit (RSU), an exit request, and means for receiving, from the RSU, at least one of a first exit command including an indication for the vehicle to begin exiting a parking area, a second exit command comprising identification information associated with another vehicle scheduled to exit the parking area immediately before the vehicle, or a third exit command comprising the exit time scheduled for the vehicle prior to the exit time.

Some aspects of the present disclosure include non-transitory computer readable media having instructions stored therein that, when executed by one or more processors of a user equipment (UE), cause the one or more processors to transmit, to a road side unit (RSU), an exit request, and receive, from the RSU, at least one of a first exit command including an indication for the vehicle to begin exiting a parking area, a second exit command comprising identification information associated with another vehicle scheduled to exit the parking area immediately before the vehicle, or a third exit command comprising the exit time scheduled for the vehicle prior to the exit time.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 1 is a diagram illustrating an example of a wireless communications system and an access network;

Figure 2:
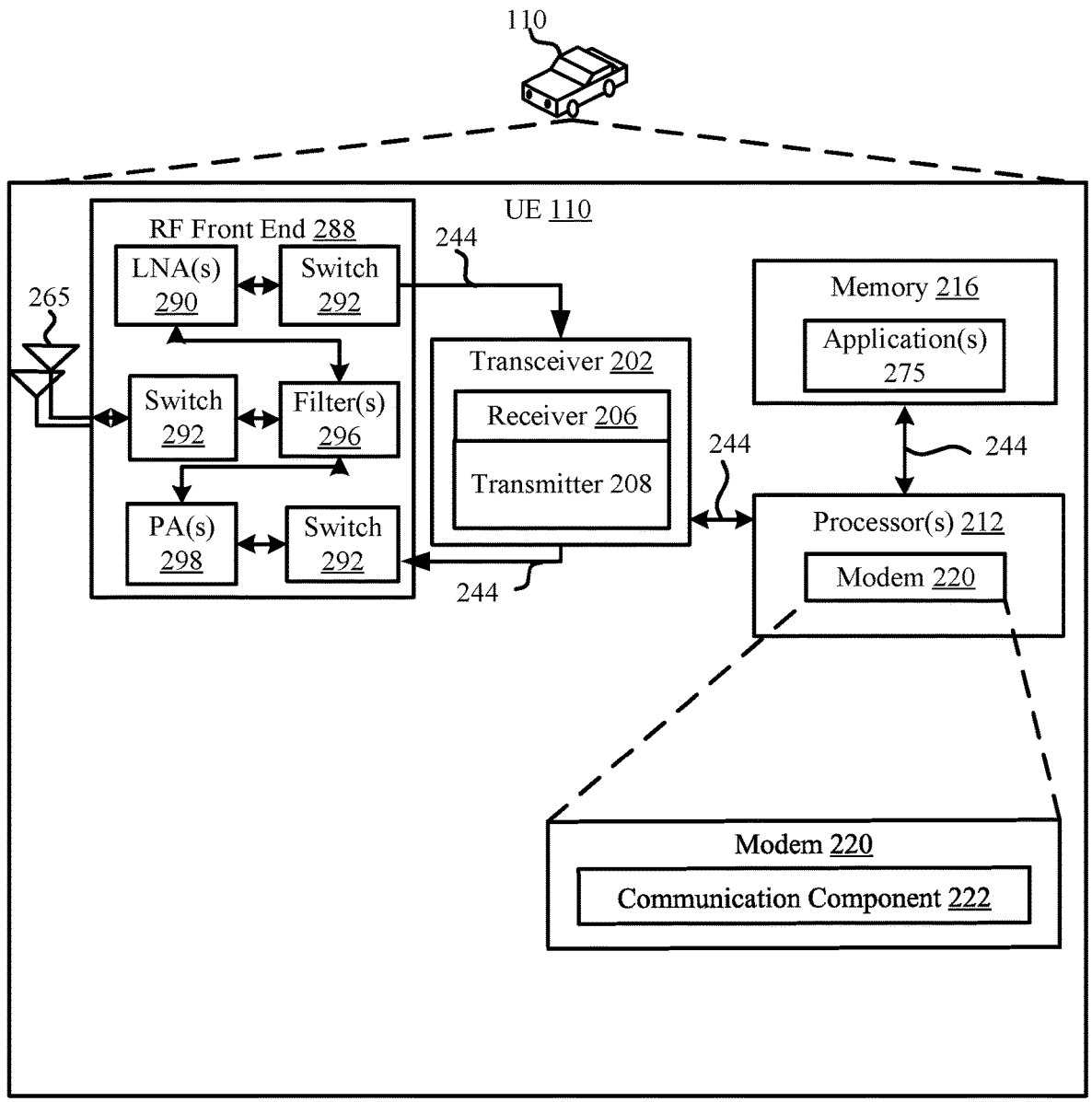
FIG. 2 is a schematic diagram of an example of a user equipment.

An appendix, the contents of which are incorporated in their entireties, is attached.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In one implementation, a RSU may communicate with vehicles via V2X communications. The RSU may receive one or more exit requests from vehicles in a parking area. The RSU may determine the exit order based on at least one of the order of receiving the one or more exit requests, vehicle information, vehicle proximities to the exit, or other criteria. The RSU may transmit the exit order to the vehicles.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells. In one implementation, the UE 110 may include a communication component 222 configured to communicate with the BS 105 via a cellular network, a Wi-Fi network, or other wireless and wired networks. In some implementations, the communication component 222 may be implemented using hardware, software, or a combination of hardware and software. In some implementations, the BS 105 may include a communication component 322 configured to communicate with the UE 110. The BS 105 may include a determination component 324 configured to determine an exit order for a number of vehicles. In some implementations, the communication component 322 and/or the determination component 324 may be implemented using hardware, software, or a combination of hardware and software.

A BS 105 configured for 4G Long-Term Evolution (LTE) (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions.

The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring to FIG. 2, one example of an implementation of the UE 110 may include a modem 220 having the communication component 222. In one implementation, the UE 110 may include a communication component 222 configured to communicate with the BS 105 via a cellular network, a Wi-Fi network, or other wireless and wired networks.

In some implementations, the UE 110 may include a variety of components, including components such as one or more processors 212 and memory 216 and transceiver 202 in communication via one or more buses 244, which may operate in conjunction with the modem 220 and the communication component 222 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the processors 212. In other aspects, some of the features of the one or more processors 212 and/or the modem 220 associated with the communication component 222 may be performed by transceiver 202.

The memory 216 may be configured to store data used and/or local versions of application 275. Also, the memory 216 may be configured to store data used herein and/or local versions of the communication component 222, and/or one or more of the subcomponents being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222, and/or one or more of the subcomponents, and/or data associated therewith, when UE 110 is operating at least one processor 212 to execute the communication component 222, and/or one or more of the subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
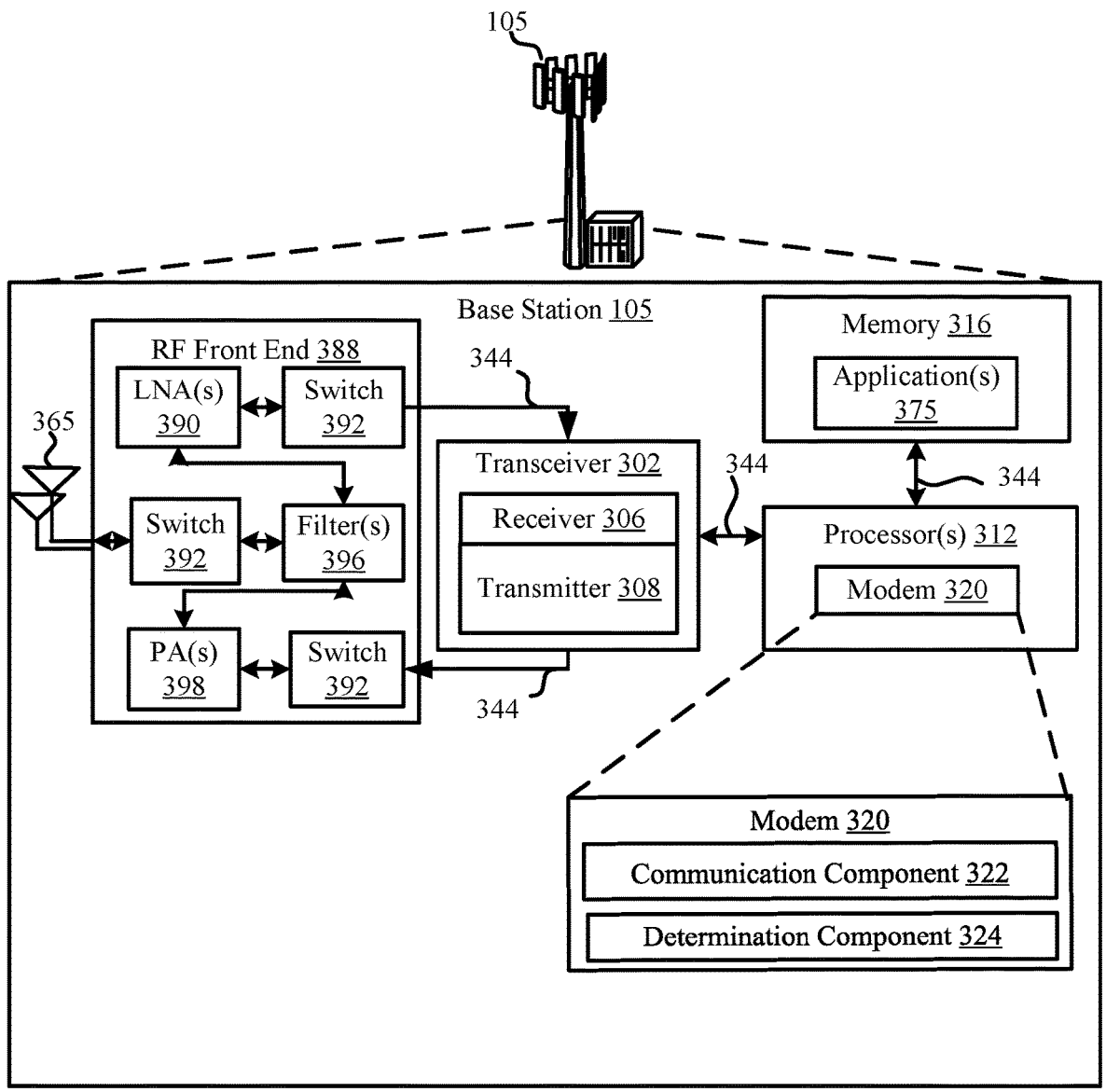
FIG. 3 is a schematic diagram of an example of a base station.

Referring to FIG. 3, one example of an implementation of the BS 105 may include a modem 320 having the communication component 322 and/or the determination component 324. In some implementations, the BS 105 may include a communication component 322 configured to communicate with the UE 110. The BS 105 may include a determination component 324 configured to determine an exit order for a number of vehicles.

In some implementations, the BS 105 may include a variety of components, including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to the communication component 322 and/or the determination component 324 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

The memory 316 may be configured to store data used herein and/or local versions of applications 375. Also, the memory 316 may be configured to store data used herein and/or local versions of the communication component 322 and/or the determination component 324, and/or one or more of the subcomponents being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322 and/or the determination component 324, and/or one or more of the subcomponents, and/or data associated therewith, when the BS 105 is operating at least one processor 312 to execute the communication component 322 and/or the determination component 324, and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, a RF receiving device. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
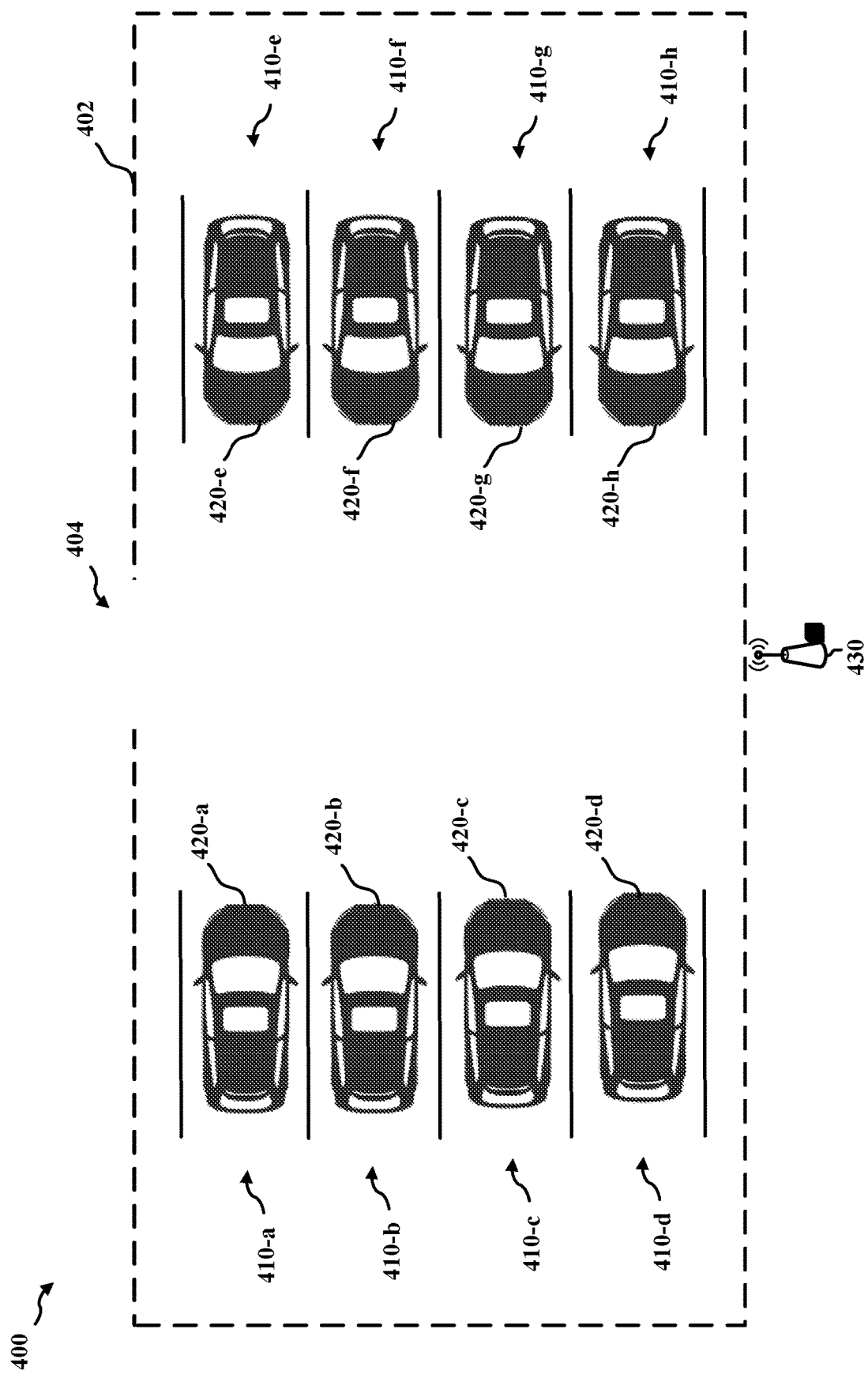
FIG. 4 illustrates an example of an environment for managing an exit order for vehicles according to aspects of the present disclosure.

FIG. 4 illustrates an example of an environment for managing exit orders for vehicles. In some implementations, referencing FIG. 1, an environment 400 may include a parking area 402 such as a parking lot, a parking garage, etc. The parking area 402 may include one or more exits 404. The parking area 402 may include vehicles 420 parked in parking spots 410 (e.g., 410-a-410-h). For example, the first vehicle 420-a may be parked in the first parking spot 410-a, the second vehicle 420-b may be parked in the second parking spot 410-b, and so forth and so on. The vehicles 420 may include UEs 110. The environment 400 may include a road side unit (RSU) 430 that communicates with the UEs 110 in the vehicles 420. The RSU 430 may be implemented as a BS 105. The parking area 402 may include vehicles with UEs 110 and vehicles without UEs 110.

In some implementations, the vehicles 420 (or the UEs 110 of the vehicles 420) may transmit exit requests to the RSU 430. Upon receiving the exit requests from the vehicles 420, the RSU 430 may determine the exit order associated with the vehicles 420. The RSU 430 may transmit exit commands (based on the exit order) to the vehicles 420. Upon receiving the exit commands from the RSU 430, the vehicles 420 may exit the parking area 402 according to the exit commands.

The RSU 430 may determine the exit order. In some aspects of the present disclosure, RSU 430 may determine the exit order based on the order of the exit requests received by the RSU 430. The RSU 430 may determine the exit order based on the proximities of the vehicles 420 to one or more exits of the parking area 402. The RSU 430 may determine the exit order based on the sizes, maneuverabilities, and/or estimated fuel consumptions of the vehicles 420. The RSU 430 may determine the exit order based on the estimated durations for the vehicles 420 to exit the parking area 402. The RSU 430 may determine the exit order based on the priorities associated with the exit request. Examples of "high priority" exit requests may include first responder vehicles (e.g., ambulance, police, etc.) requesting to exit the parking area 402. In some implementations, the RSU 430 may rely on one or more of the above to determine the exit order. Other criteria that the RSU 430 may rely on to determine the exit order include presence of pedestrians, bicyclists, or other road users, proximity to exit, and vehicle types (bus or other transportation vehicles may be granted priority and/or access to alternative/restricted exits).

In a first example, the vehicles 420 (including the UEs 110 associated with the vehicles 420) may transmit exit requests (e.g., triggered by starting the engines of the vehicles 420 and/or shift into reverse or drive gear, or sent by the operators (not shown) of the vehicles, the last known location of vehicles 420 before shutting off, current locations, camera sensors of the RSU 430 detecting the vehicles 420 are in the parking area 402, operators actions in the vehicles, remote operators actions, detection of other over-the-air requests to exit the parking area 402, etc.) to the RSU 430 after an event (e.g., concert, sport game, convention). The RSU 430 may receive the exit requests based on the following order: the fourth vehicle 420-d, the sixth vehicle 420-f, the first vehicle 420-a, the seventh vehicle 420-g, the eighth vehicle 420-h, the third vehicle 420-c, the fifth vehicle 420-e, and the second vehicle 420-b. The third vehicle 420-c may be a first responder vehicle (e.g., a police cruiser). The exit request by the third vehicle 420-c may be a high priority request indicating that the third vehicle 420-c has been requested to attend to an emergency (e.g., vehicle accidental).

In one aspect of the present disclosure, the RSU 430 may determine the exit order based on the priorities and the order of receiving the exit requests. As a results, the RSU 430 may determine that the third vehicle 420-c is to exit the parking area 402 first, followed sequentially by the fourth vehicle 420-d, the sixth vehicle 420-f, the first vehicle 420-a, the seventh vehicle 420-g, the eighth vehicle 420-h, the fifth vehicle 420-e, and the second vehicle 420-b. Other ways of determining the exit order may also be implemented (examples described below).

In some aspects of the present disclosure, upon determining the exit order, the RSU 430 may transmit exit commands to vehicles 420. The RSU 430 may transmit the exit command to each of the corresponding vehicles 420 at the respective scheduled exit time. For example, the RSU 430 may estimate that each vehicle requires a duration of $t_{exit}$ to exit the parking area 402. After determining the exit order, at t=0 (e.g., time for the RSU 430 to begin transmitting exit commands), the RSU 430 may transmit the first exit command to the third vehicle 420-c to exit parking area 402. At substantially t=$t_{exit}$, the RSU 430 may transmit the second exit command to the fourth vehicle 420-d to exit the parking area 402. At approximately t=2·$t_{exit}$, the RSU 430 may transmit the third exit command to the sixth vehicle 420-f to exit the parking area 402, and so forth and so on.

In an aspect of the present disclosure, the vehicles 420 may begin to exit the parking area 402 in response to receiving the exit command at the scheduled exit time. For example, the third vehicle 420-c may begin to exit the parking area 402 after receiving the first exit command at approximately t=0. The fourth vehicle 420-d may begin to exit the paring area 402 after receiving the second exit command at approximately t=$t_{exit}$, and so forth and so on.

In certain aspects of the present disclosure, the RSU 430 may rely on sensors (not shown), such as visual sensors, proximity sensors, and/or positioning sensors, to determine whether an exiting vehicle has begun exiting the parking area or safely exited the parking area 402 before transmitting the next exit command to the next vehicle scheduled to exit the parking area 402. In some aspects, the RSU 430 may utilize the sensors to detect to monitor for the presence of pedestrians or other vehicles (other than the vehicles 420) in the parking area 402. The RSU 430 may, in response to detecting pedestrians (for example), may issue an updated exit command to the vehicles 420 (e.g., instructing the vehicles to temporarily suspend the exiting due to the pedestrians).

In certain aspects, the vehicles 420 may utilize sensors (not shown), such as visual sensors, proximity sensors, and/or positioning sensors, to improve safety as the vehicles 420 exit the parking area 402. For example, the vehicles may utilize sensors to monitor for the presence of pedestrians or other vehicles in the parking area 402.

In one aspect, the UEs 110 associated with the vehicles 420 may display the exit commands and/or information associated with the exit commands to one or more operators (via a display, not shown) of the vehicles 420, or via a display screen of the UEs 110, and the one or more operators may operate the vehicles 420 based on the exit commands and/or information associated with the exit commands. In another aspect, the UEs 110 associated with the vehicles 420 may transmit the exit commands and/or information associated with the exit commands to one or more autonomous drive systems associated with the vehicles 420. The one or more autonomous drive systems may operate the vehicles 420 based on the exit commands and/or information associated with the exit commands.

In a second example, the vehicles 420 (including the UEs 110 associated with the vehicles 420) may transmit exit requests to the RSU 430 at the end of a work shift, a work day, or a school day. The RSU 430 may receive the exit requests from the vehicles 420. The exit requests may include vehicle information associated with the corresponding vehicle 420. For example, an exit request from the first vehicle 420-a may include the make, model, type, estimated gas efficiency, or other vehicle information associated with the first vehicle 420-a. The exit request from the remaining vehicles 420 may include similar or different vehicle information regarding the respective vehicles 420.

In one aspect of the present disclosure, the RSU 430 may determine the exit order based on the vehicle information included in the exit requests. For example, the RSU 430 may determine to allow smaller vehicles (e.g., lower lengths and/or width, better maneuverability) to exit first to allow larger vehicles (lower maneuverability) more room to exit the parking area 402. Alternatively, the RSU 430 may determine to allow less fuel efficient vehicles to leave first to conserve fuel. As a results, the RSU 430 may determine that the sixth vehicle 420-f is to exit the parking area 402 first, followed sequentially by the first vehicle 420-a, the fifth vehicle 420-e, the fourth vehicle 420-d, the third vehicle 420-c, the second vehicle 420-b, the eighth vehicle 420-h, and the seventh vehicle 420-g.

In some aspects of the present disclosure, upon determining the exit order, the RSU 430 may transmit exit commands to vehicles 420. The RSU 430 may transmit, to the vehicles 420, the scheduled exit time for each of the vehicles 420 to exit the parking area 402, with the exit commands. For example, the RSU 430 may estimate that each vehicle requires a duration of $t_{exit}'$ to exit the parking area 402. After determining the exit order, at t=0 (e.g., time for the RSU 430 to begin transmitting exit commands), the RSU 430 may transmit the exit commands. The exit command to the sixth vehicle 420-f (first vehicle scheduled to exit the parking area 402) may include the exit time of t=0. The exit command to the first vehicle 420-a may include the exit time of t=$t_{exit}'$. The exit command to the fifth vehicle 420-e may include the exit time of t=2·$t_{exit}'$, and so forth and so on.

In some aspects, the vehicles 420 may begin to exit the parking area 402 based on the assigned exit times in the exit commands. For example, after receiving the exit commands including the scheduled exit times, the sixth vehicle 420-f (first vehicle scheduled to exit the parking area 402) may begin to exit the parking area 402 at substantially t=0. The first vehicle 420-a may begin to exit the parking area 402 at substantially t=$t_{exit}'$. The fifth vehicle 420-e may begin to exit the parking area 402 at substantially t=2·$t_{exit}'$, and so forth and so on.

In a third example, the vehicles 420 (including the UEs 110 associated with the vehicles 420) may transmit exit requests to the RSU 430. The RSU 430 may receive the exit requests from the vehicles 420. The exit requests may include identification information associated with the corresponding vehicle 420. For example, an exit request from the first vehicle 420-a may include the make, model, color, license plate, build (e.g., "touring package," chrome wheels, etc.), locations of the vehicle, identification marks (e.g., scratches), accessories (e.g., spoilers), vehicle type or other identification information associated with the first vehicle 420-a. The exit request from the remaining vehicles 420 may include similar or different identification information regarding the respective vehicles 420.

In one aspect of the present disclosure, the RSU 430 may determine the exit order based on the identification information included in the exit requests. For example, the RSU 430 may determine to allow vehicles closer to the one or more exits 404 to exit first. As a results, the RSU 430 may determine that the fifth vehicle 420-e is to exit the parking area 402 first, followed sequentially by the first vehicle 420-a, the sixth vehicle 420-f, the second vehicle 420-b, the seventh vehicle 420-g, the third vehicle 420-c, the eighth vehicle 420-h, and the fourth vehicle 420-d.

In some aspects of the present disclosure, upon determining the exit order, the RSU 430 may transmit exit commands to vehicles 420. The RSU 430 may transmit, to the first vehicle scheduled to exit, the exit command to exit the parking area 402. The RSU 430 may transmit, to the remaining vehicles, identifying information associated with the vehicle that is scheduled to exit before each of the remaining vehicles. The exit commands may indicate to the remaining vehicles to follow the vehicle that is scheduled to exit before each of the remaining vehicles. For example, the RSU 430 may transmit, to the fifth vehicle 420-*e*, the first exit command to exit the parking area 402. The RSU 430 may transmit, to the first vehicle 420-*a*, the second exit command including identifying information (e.g., color, make, model, accessories, etc.) associated with the fifth vehicle 420-*e* (e.g., blue Honda Accord with a black spoiler). The RSU 430, in the second exit command, may indicate to the first vehicle 420-*a* to follow the fifth vehicle 420-*e* to exit the parking area 402. The RSU 430 may transmit, to the sixth vehicle 420-*f*, the third exit command including identifying information associated with the first vehicle 420-*a* (e.g., red Ford F-150™ truck). The RSU 430, in the second exit command, may indicate to the sixth vehicle 420-*f* that the sixth vehicle 420-*f* is scheduled to exit after the "red Ford F-150™ truck" (i.e., the first vehicle 420-*a*.

In some aspects, the vehicles 420 may begin to exit the parking area 402 based on the exit order in the exit commands. For example, after receiving the exit commands, the fifth vehicle 420-*e* may begin to exit the parking area 402. The first vehicle 420-*a* may follow the fifth vehicle 420-*e* to exit the parking area 402. The sixth vehicle 420-*f* may follow the first vehicle 420-*a* to exit the parking area 402, and so forth and so on.

In other implementations, different numbers of vehicles, RSUs, and exits in a parking area may be implemented according to aspects of the present disclosure.

Figure 5:
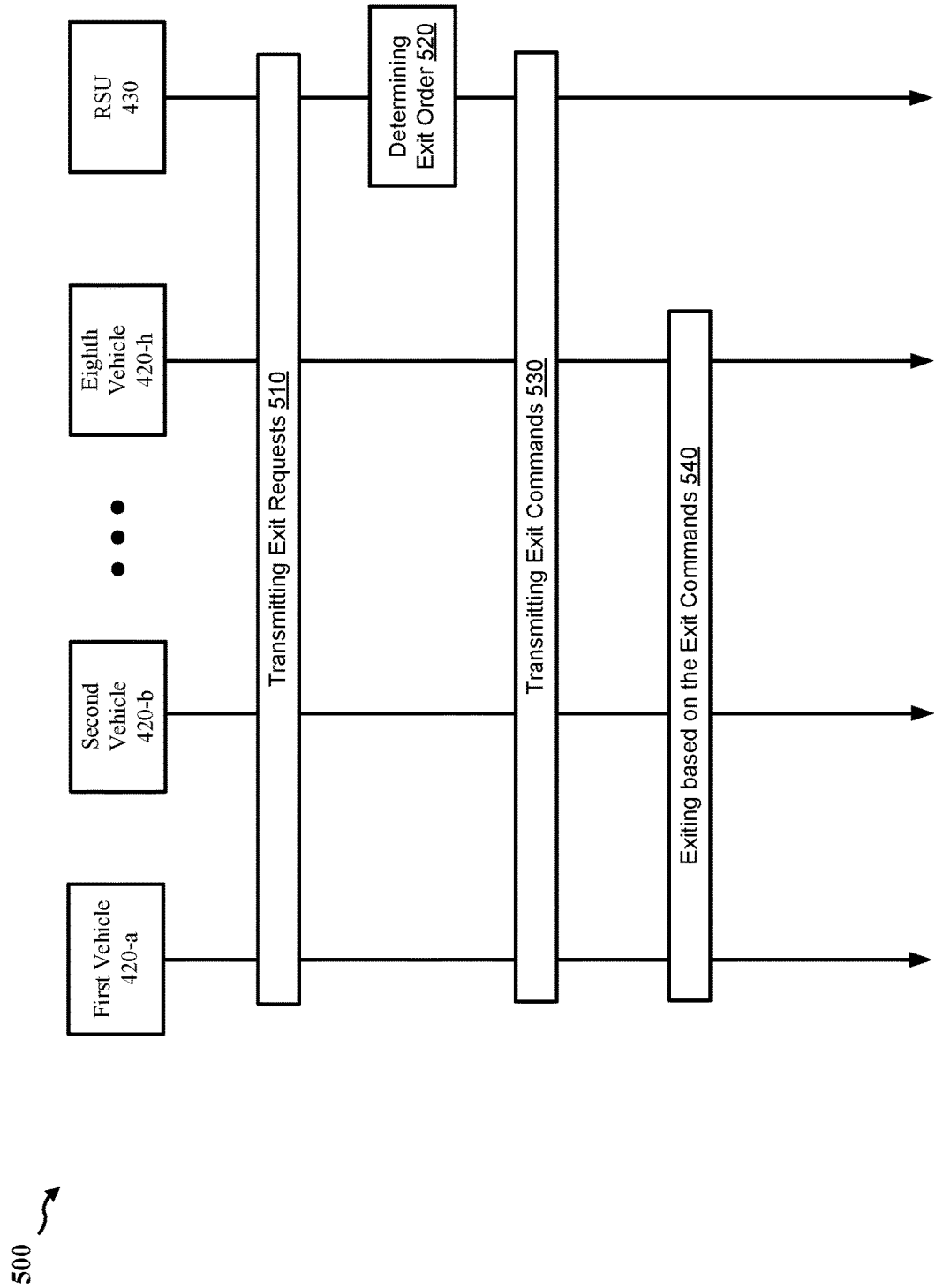
FIG. 5 illustrates an example of a process flow diagram for parking lot exit management using V2X according to aspects of the present disclosure.

FIG. 5 illustrates an example of a process flow diagram for parking lot exit management using V2X. In some implementations, referencing FIG. 4, the diagram 500 may include the vehicles 420 and the RSU 430. At 510, the vehicles 420 may transmit the exit requests to RSU 430. The exit requests may be implemented as one or more messages. The one or more messages may include at least one of the following fields: a sequence number, a device identifier, a timer, a vehicle latitude, a vehicle longitude, a vehicle elevation, a host type, a message type, a vehicle categorization, a vehicle classification, or a priority. At 520, the RSU 430 may determine the exit order based on the information in the exit requests as discussed above. At 530, the RSU 430 may transmit the exit commands to the vehicles 420. The exit commands may include one or more messages. The one or more messages may include at least one of the following fields: an exit start time, a preceding vehicle, or an exit location. At 540, the vehicles 420 may exit the parking area 402 based on the exit commands.

Figure 6:
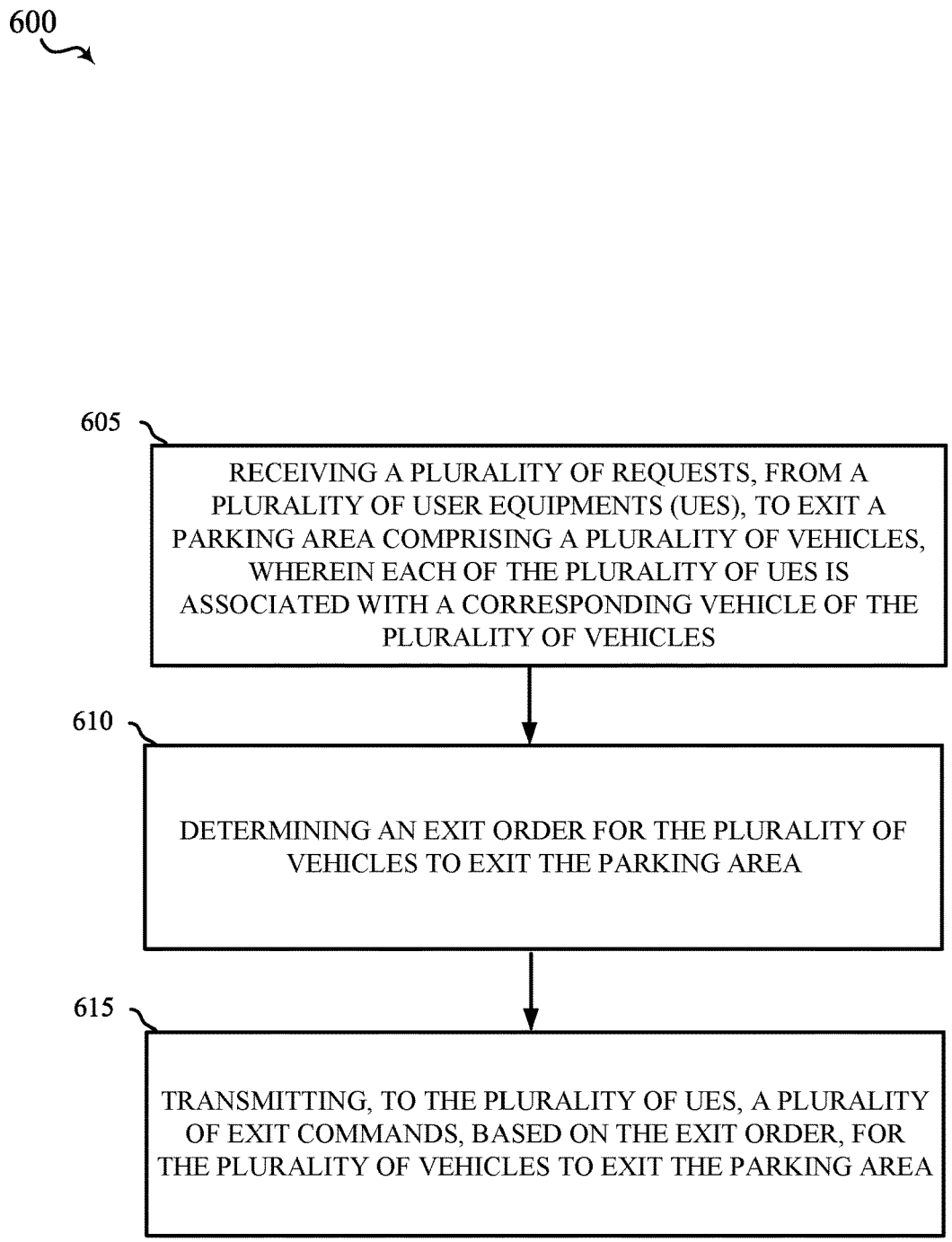
FIG. 6 illustrate an example of a method for performing parking lot exit management using V2X by a RSU according to aspects of the present disclosure.

FIG. 6 illustrate an example of a method for performing parking lot exit management using V2X by a RSU. For example, a method 600 may be performed by the one or more of the processor 312, the memory 316, the applications 375, the modem 320, the transceiver 302, the receiver 306, the transmitter 308, the RF front end 388, the communication component 322 and/or the determination component 324, and/or one or more other components of the BS 105 in the wireless communication network 100.

At block 605, the method 600 may receive a plurality of requests, from a plurality of user equipments (UEs), to exit a parking area comprising a plurality of vehicles, wherein each of the plurality of UEs is associated with a corresponding vehicle of the plurality of vehicles. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may receive a plurality of requests, from a plurality of user equipments (UEs), to exit a parking area comprising a plurality of vehicles, wherein each of the plurality of UEs is associated with a corresponding vehicle of the plurality of vehicles as described above. The RF front end 388 may receive the electrical signals converted from electro-magnetic signals. The RF front end 388 may filter and/or amplify the electrical signals. The transceiver 302 or the receiver 306 may convert the electrical signals to digital signals, and send the digital signals to the communication component 322.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for receiving a plurality of requests, from a plurality of user equipments (UEs), to exit a parking area comprising a plurality of vehicles, wherein each of the plurality of UEs is associated with a corresponding vehicle of the plurality of vehicles.

At block 610, the method 600 may determine an exit order for the plurality of vehicles to exit the parking area. For example, the determination component 324, the processor 312, the memory 316, the modem 320, and/or the applications 375 of the BS 105 may determine an exit order for the plurality of vehicles to exit the parking area as described above.

In certain implementations, the determination component 324, the processor 312, the memory 316, the modem 320, and/or the applications 375 may be configured to and/or may define means for determining an exit order for the plurality of vehicles to exit the parking area.

At block 615, the method 600 may transmit, to the plurality of UEs, a plurality of exit commands, based on the exit order, for the plurality of vehicles to exit the parking area. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may transmit, to the plurality of UEs, a plurality of exit commands, based on the exit order, for the plurality of vehicles to exit the parking area. The communication component 322 may send the digital signals to the transceiver 302 or the transmitter 304. The transceiver 302 or the transmitter 304 may convert the digital signals to electrical signals and send to the RF front end 388. The RF front end 388 may filter and/or amplify the electrical signals. The RF front end 388 may send the electrical signals as electro-magnetic signals via the one or more antennas 365.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for transmitting, to the plurality of UEs, a plurality of exit commands, based on the exit order, for the plurality of vehicles to exit the parking area.

Alternatively or additionally, the method 600 may further include any of the methods above, wherein receiving the plurality of requests comprises receiving an emergency exit request from a first responder vehicle of the plurality of vehicle, and wherein determining the exit order comprises prioritizing the first responder vehicle in the exit order for the plurality of vehicles. The first responder vehicles may get priority when determining the exit order.

Alternatively or additionally, the method 600 may further include any of the methods above, wherein the exit order comprises determining the exit order based on one or more of a reception order associated with receiving the plurality of requests, proximities of the plurality of vehicles to one or more exits of the parking area, sizes of the plurality of vehicles, maneuverabilities of the plurality of vehicles, estimated durations for the plurality of vehicles to exit the parking area, estimated fuel consumptions of the plurality of vehicles, or priorities associated with the plurality of requests.

Alternatively or additionally, the method 600 may further include any of the methods above, wherein transmitting the plurality of exit commands comprises sequentially transmitting each of the plurality of exit commands at substantially a corresponding scheduled exit time of a plurality of scheduled exit times in accordance with the exit order.

Alternatively or additionally, the method 600 may further include any of the methods above, wherein transmitting the plurality of exit commands comprises transmitting a first exit command of the plurality of exit commands to a first vehicle of the plurality of vehicles scheduled to exit the parking area before remaining vehicles of the plurality of vehicles, and transmitting, to the remaining vehicles, remaining exit commands of the plurality of exit commands each comprising identification information associated with a vehicle scheduled to exit the parking area immediately before each of the remaining vehicles.

Alternatively or additionally, the method 600 may further include any of the methods above, wherein the identification information includes at least one of a make, a model, a color, a license plate, a build, a location, or a vehicle type.

Alternatively or additionally, the method 600 may further include any of the methods above, wherein transmitting the plurality of exit commands comprises transmitting a plurality of scheduled exit times.

Alternatively or additionally, the method 600 may further include any of the methods above, wherein the plurality of exit commands comprises location information associated with one or more exits of the parking area.

Alternatively or additionally, the method 600 may further include any of the methods above, further comprising monitoring the plurality of vehicles exiting the parking area, detecting at least one of an exit order, a collision, a pedestrian, or a high-priority exit request, and transmitting, to at least a subset of the plurality of vehicles, a plurality of updated exit commands in response detecting the at least one of the out-of-order exit, the collision, the pedestrian, or the emergency exit request.

Figure 7:
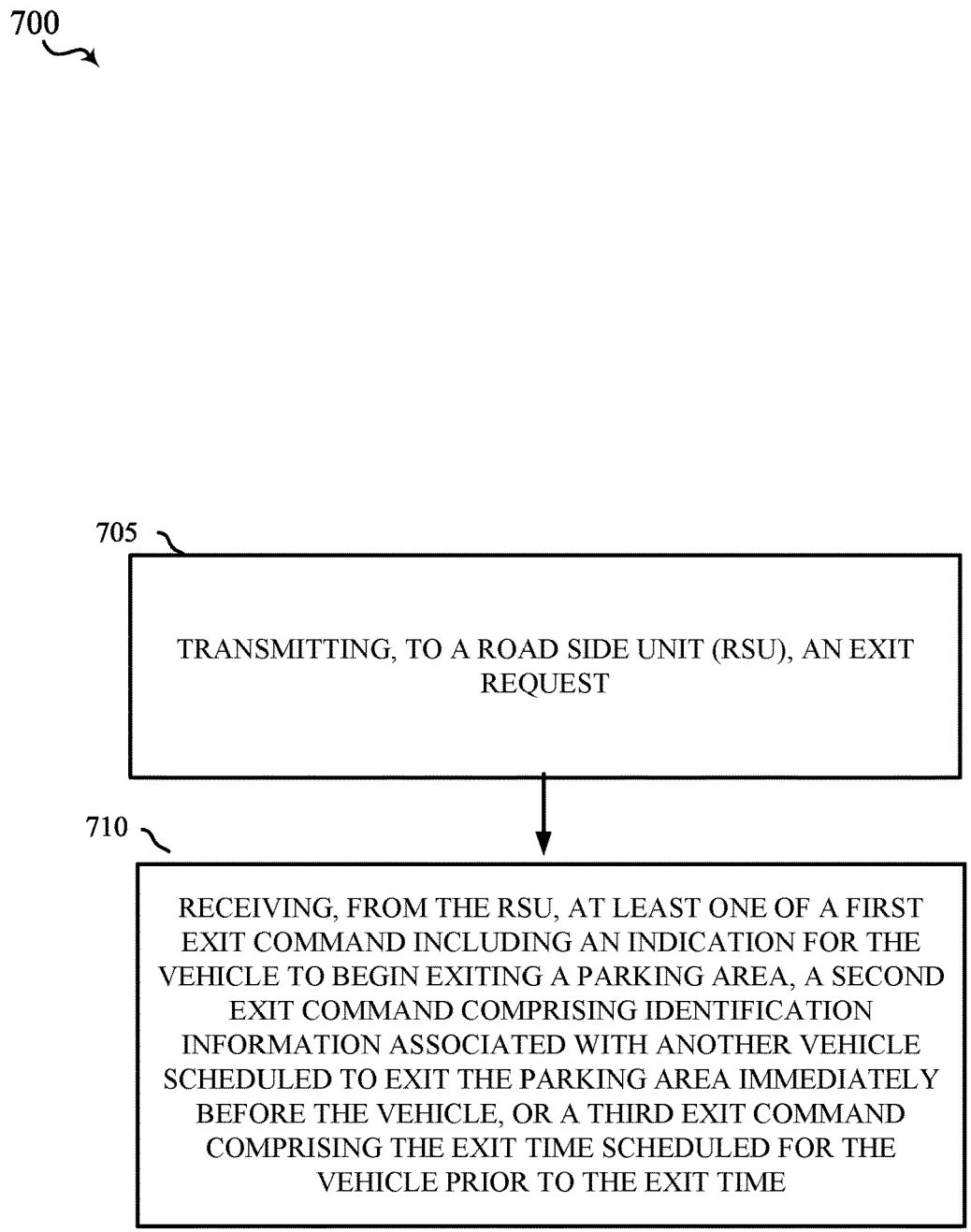
FIG. 7 illustrate an example of method of receiving exit commands in parking lot exit management using V2X system according to aspects of the present disclosure.

FIG. 7 illustrate an example of method of receiving exit commands in a parking lot exit management system using V2X. For example, a method 700 may be performed by the one or more of the processor 212, the memory 216, the applications 275, the modem 220, the transceiver 202, the receiver 206, the transmitter 208, the RF front end 288, the communication component 222, and/or one or more other components of the UE 110 in the wireless communication network 100.

At block 705, the method 700 may transmit, to a road side unit (RSU), an exit request. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit, to a road side unit (RSU), an exit request as described above. The communication component 222 may send the digital signals to the transceiver 202 or the transmitter 204. The transceiver 202 or the transmitter 204 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting, to a road side unit (RSU), an exit request.

At block 710, the method 700 may receive, from the RSU, at least one of a first exit command including an indication for the vehicle to begin exiting a parking area, a second exit command comprising identification information associated with another vehicle scheduled to exit the parking area immediately before the vehicle, or a third exit command comprising the exit time scheduled for the vehicle prior to the exit time. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive, from the RSU, at least one of a first exit command including an indication for the vehicle to begin exiting a parking area, a second exit command comprising identification information associated with another vehicle scheduled to exit the parking area immediately before the vehicle, or a third exit command comprising the exit time scheduled for the vehicle prior to the exit time as described above. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving, from the RSU, at least one of a first exit command including an indication for the vehicle to begin exiting a parking area, a second exit command comprising identification information associated with another vehicle scheduled to exit the parking area immediately before the vehicle, or a third exit command comprising the exit time scheduled for the vehicle prior to the exit time.

Alternatively or additionally, the method 700 may further include any of the methods above, wherein transmitting the exit request comprises transmitting an emergency exit request from a first responder vehicle, and wherein receiving the at least one of the first exit command, the second exit command, or the third exit command comprises receiving a priority exit command to exit the parking area ahead of a plurality of vehicles.

Alternatively or additionally, the method 700 may further include any of the methods above, wherein the identification information includes at least one of a make, a model, a color, a license plate, a build, a identifying mark, or an accessory associated with the other vehicle.

Alternatively or additionally, the method 700 may further include any of the methods above, further comprising displaying via a graphical user interface, exit information based on the at least one of the first exit command, the second exit command, or the third exit command.

Alternatively or additionally, the method 700 may further include any of the methods above, further comprising transmitting, to an autonomous drive system, exit information based on the at least one of the first exit command, the second exit command, or the third exit command in accordance with the exit command.

ADDITIONAL IMPLEMENTATIONS

Aspects of the present disclosure include methods by a road side unit for receiving a plurality of requests, from a plurality of user equipments (UEs), to exit a parking area comprising a plurality of vehicles, wherein each of the plurality of UEs is associated with a corresponding vehicle of the plurality of vehicles, determining an exit order for the plurality of vehicles to exit the parking area, and transmitting, to the plurality of UEs, a plurality of exit commands, based on the exit order, for the plurality of vehicles to exit the parking area.

Any of the methods above, wherein receiving the plurality of requests comprises receiving an emergency exit request from a first responder vehicle of the plurality of vehicle, and wherein determining the exit order comprises prioritizing the first responder vehicle in the exit order for the plurality of vehicles.

Any of the methods above, wherein the exit order comprises determining the exit order based on one or more of a reception order associated with receiving the plurality of requests, proximities of the plurality of vehicles to one or more exits of the parking area, sizes of the plurality of vehicles, maneuverabilities of the plurality of vehicles, estimated durations for the plurality of vehicles to exit the parking area, estimated fuel consumptions of the plurality of vehicles, or priorities associated with the plurality of requests.

Any of the methods above, wherein transmitting the plurality of exit commands comprises sequentially transmitting each of the plurality of exit commands at substantially a corresponding scheduled exit time of a plurality of scheduled exit times in accordance with the exit order.

Any of the methods above, wherein transmitting the plurality of exit commands comprises transmitting a first exit command of the plurality of exit commands to a first vehicle of the plurality of vehicles scheduled to exit the parking area before remaining vehicles of the plurality of vehicles, and transmitting, to the remaining vehicles, remaining exit commands of the plurality of exit commands each comprising identification information associated with a vehicle scheduled to exit the parking area immediately before each of the remaining vehicles.

Any of the methods above, wherein the identification information includes at least one of a make, a model, a color, a license plate, a build, a location, or a vehicle type.

Any of the methods above, wherein transmitting the plurality of exit commands comprises transmitting a plurality of scheduled exit times.

Any of the methods above, wherein the plurality of exit commands comprises location information associated with one or more exits of the parking area.

Any of the methods above, further comprising monitoring the plurality of vehicles exiting the parking area, detecting at least one of an exit order, a collision, a pedestrian, or a high-priority exit request, and transmitting, to at least a subset of the plurality of vehicles, a plurality of updated exit commands in response detecting the at least one of the out-of-order exit, the collision, the pedestrian, or the emergency exit request.

Other aspects of the present disclosure include a road side unit having a memory comprising instructions, a transceiver, and one or more processors operatively coupled with the memory and the transceiver, the one or more processors configured to execute instructions in the memory to receive a plurality of requests, from a plurality of user equipments (UEs), to exit a parking area comprising a plurality of vehicles, wherein each of the plurality of UEs is associated with a corresponding vehicle of the plurality of vehicles, determine an exit order for the plurality of vehicles to exit the parking area, and transmit, to the plurality of UEs, a plurality of exit commands, based on the exit order, for the plurality of vehicles to exit the parking area.

Any of the road side units above, wherein receiving the plurality of requests comprises receiving an emergency exit request from a first responder vehicle of the plurality of vehicles, and wherein determining the exit order comprises prioritizing the first responder vehicle in the exit order for the plurality of vehicles.

Any of the road side units above, wherein determining the exit order comprises determine the exit order based on one or more of a reception order associated with receiving the plurality of requests, proximities of the plurality of vehicles to one or more exits of the parking area, sizes of the plurality of vehicles, maneuverabilities of the plurality of vehicles, estimated durations for the plurality of vehicles to exit the parking area, estimated fuel consumptions of the plurality of vehicles, or priorities associated with the plurality of requests.

Any of the road side units above, wherein transmitting the plurality of exit commands comprises sequentially transmit each of the plurality of exit commands at substantially a corresponding scheduled exit time of a plurality of scheduled exit times in accordance with the exit order.

Any of the road side units above, wherein transmitting the plurality of exit commands comprises transmit a first exit command of the plurality of exit commands to a first vehicle of the plurality of vehicles scheduled to exit the parking area before remaining vehicles of the plurality of vehicles, and transmit to the remaining vehicles, remaining exit commands of the plurality of exit commands each comprising identification information associated with a vehicle scheduled to exit the parking area immediately before each of the remaining vehicles.

Any of the road side units above, wherein the identification information includes at least one of a make, a model, a color, a license plate, a build, a location, or a vehicle type.

Any of the road side units above, wherein transmitting the plurality of exit commands comprises transmit a plurality of scheduled exit times.

Any of the road side units above, wherein the plurality of exit commands comprises location information associated with one or more exits of the parking area.

Any of the road side units above, wherein the one or more processors are further configured to monitor the plurality of vehicles exiting the parking area, detect at least one of an exit order, a collision, a pedestrian, or a high-priority exit request, and transmit, to at least a subset of the plurality of vehicles, a plurality of updated exit commands in response detecting the at least one of the out-of-order exit, the collision, the pedestrian, or the emergency exit request.

An aspect of the present disclosure includes a road side unit including means for receiving a plurality of requests, from a plurality of user equipments (UEs), to exit a parking area comprising a plurality of vehicles, wherein each of the plurality of UEs is associated with a corresponding vehicle of the plurality of vehicles, determining an exit order for the plurality of vehicles to exit the parking area, and transmitting, to the plurality of UEs, a plurality of exit commands, based on the exit order, for the plurality of vehicles to exit the parking area.

Any of the road side units above, wherein means for receiving the plurality of requests comprises means for receiving an emergency exit request from a first responder vehicle of the plurality of vehicle, and wherein determining the exit order comprises prioritizing the first responder vehicle in the exit order for the plurality of vehicles.

Any of the road side units above, wherein means for determining the exit order comprises means for determining the exit order based on one or more of a reception order associated with receiving the plurality of requests, proximities of the plurality of vehicles to one or more exits of the parking area, sizes of the plurality of vehicles, maneuverabilities of the plurality of vehicles, estimated durations for the plurality of vehicles to exit the parking area, estimated fuel consumptions of the plurality of vehicles, or priorities associated with the plurality of requests.

Any of the road side units above, wherein means for transmitting the plurality of exit commands comprises means for sequentially transmitting each of the plurality of exit commands at substantially a corresponding scheduled exit time of a plurality of scheduled exit times in accordance with the exit order.

Any of the road side units above, wherein means for transmitting the plurality of exit commands comprises means for transmitting a first exit command of the plurality of exit commands to a first vehicle of the plurality of vehicles scheduled to exit the parking area before remaining vehicles of the plurality of vehicles, and transmitting, to the remaining vehicles, remaining exit commands of the plurality of exit commands each comprising identification information associated with a vehicle scheduled to exit the parking area immediately before each of the remaining vehicles.

Any of the road side units above, wherein the identification information includes at least one of a make, a model, a color, a license plate, a build, a location, or a vehicle type.

Any of the road side units above, wherein means for transmitting the plurality of exit commands comprises means for transmitting a plurality of scheduled exit times.

Any of the road side units above, wherein the plurality of exit commands comprises location information associated with one or more exits of the parking area.

Any of the road side units above, further comprising means for monitoring the plurality of vehicles exiting the parking area, detecting at least one of an exit order, a collision, a pedestrian, or a high-priority exit request, and means for transmitting, to at least a subset of the plurality of vehicles, a plurality of updated exit commands in response detecting the at least one of the out-of-order exit, the collision, the pedestrian, or the emergency exit request.

Some aspects of the present disclosure include non-transitory computer readable media having instructions stored therein that, when executed by one or more processors of a road side unit, cause the one or more processors to receive a plurality of requests, from a plurality of user equipments (UEs), to exit a parking area comprising a plurality of vehicles, wherein each of the plurality of UEs is associated with a corresponding vehicle of the plurality of vehicles, determine an exit order for the plurality of vehicles to exit the parking area, and transmit, to the plurality of UEs, a plurality of exit commands, based on the exit order, for the plurality of vehicles to exit the parking area.

Any of the non-transitory computer readable media above, wherein the instructions for receiving the plurality of requests comprises instructions, when executed by the one or more processors, cause the one or more processors to receive an emergency exit request from a first responder vehicle of the plurality of vehicle, and wherein the instructions to determine the exit order comprises instructions that, when executed by the one or more processors, cause the one or more processors to prioritize the first responder vehicle in the exit order for the plurality of vehicles.

Any of the non-transitory computer readable media above, wherein the instructions for determining the exit order comprises instructions, when executed by the one or more processors, cause the one or more processors to determine the exit order based on one or more of a reception order associated with receiving the plurality of requests, proximities of the plurality of vehicles to one or more exits of the parking area, sizes of the plurality of vehicles, maneuverabilities of the plurality of vehicles, estimated durations for the plurality of vehicles to exit the parking area, estimated fuel consumptions of the plurality of vehicles, or priorities associated with the plurality of requests.

Any of the non-transitory computer readable media above, wherein the instructions for transmitting the plurality of exit commands comprises instructions, when executed by the one or more processors, cause the one or more processors to sequentially transmit each of the plurality of exit commands at substantially a corresponding scheduled exit time of a plurality of scheduled exit times in accordance with the exit order.

Any of the non-transitory computer readable media above, wherein the instructions for transmitting the plurality of exit commands comprises instructions, when executed by the one or more processors, cause the one or more processors to transmit a first exit command of the plurality of exit commands to a first vehicle of the plurality of vehicles scheduled to exit the parking area before remaining vehicles of the plurality of vehicles, and transmit to the remaining vehicles, remaining exit commands of the plurality of exit commands each comprising identification information associated with a vehicle scheduled to exit the parking area immediately before each of the remaining vehicles.

Any of the non-transitory computer readable media above, wherein identification information includes at least one of a make, a model, a color, a license plate, a build, a location, or a vehicle type.

Any of the non-transitory computer readable media above, wherein the instructions for transmitting the plurality of exit commands comprises instructions, when executed by the one or more processors, cause the one or more processors to transmit a plurality of scheduled exit times.

Any of the non-transitory computer readable media above, wherein plurality of exit commands comprises location information associated with one or more exits of the parking area.

Any of the non-transitory computer readable media above, further comprising instructions, when executed by the one or more processors, cause the one or more processors to monitor the plurality of vehicles exiting the parking area, detect at least one of an exit order, a collision, a pedestrian, or a high-priority exit request, and transmit, to at least a subset of the plurality of vehicles, a plurality of updated exit commands in response detecting the at least one of the out-of-order exit, the collision, the pedestrian, or the emergency exit request.

Aspects of the present disclosure include methods by a user equipment (UE) for transmitting, to a road side unit (RSU), an exit request, and receiving, from the RSU, at least one of a first exit command including an indication for the vehicle to begin exiting a parking area, a second exit command comprising identification information associated with another vehicle scheduled to exit the parking area immediately before the vehicle, or a third exit command comprising the exit time scheduled for the vehicle prior to the exit time.

Any of the methods above, wherein transmitting the exit request comprises transmitting an emergency exit request from a first responder vehicle, and wherein receiving the at least one of the first exit command, the second exit command, or the third exit command comprises receiving a priority exit command to exit the parking area ahead of a plurality of vehicles.

Any of the methods above, wherein the identification information includes at least one of a make, a model, a color, a license plate, a build, a identifying mark, or an accessory associated with the other vehicle.

Any of the methods above, further comprising displaying via a graphical user interface, exit information based on the at least one of the first exit command, the second exit command, or the third exit command.

Any of the methods above, further comprising transmitting, to an autonomous drive system, exit information based on the at least one of the first exit command, the second exit command, or the third exit command in accordance with the exit command.

Other aspects of the present disclosure include a user equipment (UE) having a memory comprising instructions, a transceiver, and one or more processors operatively coupled with the memory and the transceiver, the one or more processors configured to execute instructions in the memory to transmit, to a road side unit (RSU), an exit request, and receive, from the RSU, at least one of a first exit command including an indication for the vehicle to begin exiting a parking area, a second exit command comprising identification information associated with another vehicle scheduled to exit the parking area immediately before the vehicle, or a third exit command comprising the exit time scheduled for the vehicle prior to the exit time.

Any of the UEs above, wherein transmitting the exit request comprises transmitting an emergency exit request from a first responder vehicle, and wherein receiving the at least one of the first exit command, the second exit command, or the third exit command comprises receiving a priority exit command to exit the parking area ahead of a plurality of vehicles.

Any of the UEs above, wherein the identification information includes at least one of a make, a model, a color, a license plate, a build, a identifying mark, or an accessory associated with the other vehicle.

Any of the UEs above, wherein the one or more processors are further configured to display, via a graphical user interface, exit information based on the at least one of the first exit command, the second exit command, or the third exit command.

Any of the UEs above, wherein the one or more processors are further configured to transmit, to an autonomous drive system, exit information based on the at least one of the first exit command, the second exit command, or the third exit command in accordance with the exit command.

An aspect of the present disclosure includes a user equipment (UE) including means for transmitting, to a road side unit (RSU), an exit request, and receiving, from the RSU, at least one of a first exit command including an indication for the vehicle to begin exiting a parking area, a second exit command comprising identification information associated with another vehicle scheduled to exit the parking area immediately before the vehicle, or a third exit command comprising the exit time scheduled for the vehicle prior to the exit time.

Any of the UEs above, wherein means for transmitting the exit request comprises means for transmitting an emergency exit request from a first responder vehicle, and wherein means for receiving the at least one of the first exit command, the second exit command, or the third exit command comprises means for receiving a priority exit command to exit the parking area ahead of a plurality of vehicles.

Any of the UEs above, wherein the identification information includes at least one of a make, a model, a color, a license plate, a build, a identifying mark, or an accessory associated with the other vehicle.

Any of the UEs above, further comprising means for displaying via a graphical user interface, exit information based on the at least one of the first exit command, the second exit command, or the third exit command.

Any of the UEs above, further comprising means for transmitting, to an autonomous drive system, exit information based on the at least one of the first exit command, the second exit command, or the third exit command in accordance with the exit command.

Some aspects of the present disclosure include non-transitory computer readable media having instructions stored therein that, when executed by one or more processors of a user equipment (UE), cause the one or more processors to transmit, to a road side unit (RSU), an exit request, and receive, from the RSU, at least one of a first exit command including an indication for the vehicle to begin exiting a parking area, a second exit command comprising identification information associated with another vehicle scheduled to exit the parking area immediately before the vehicle, or a third exit command comprising the exit time scheduled for the vehicle prior to the exit time.

Any of the non-transitory computer readable media above, wherein the instructions for transmitting the exit request comprises instructions, when executed by the one or more processors, cause the one or more processors to transmit an emergency exit request from a first responder vehicle, and wherein the instructions to receive the at least one of the first exit command, the second exit command, or the third exit command comprises instructions that, when executed by the one or more processors, cause the one or more processors to receive a priority exit command to exit the parking area ahead of a plurality of vehicles.

Any of the non-transitory computer readable media above, wherein the identification information includes at least one of a make, a model, a color, a license plate, a build, a identifying mark, or an accessory associated with the other vehicle.

Any of the non-transitory computer readable media above, further comprising instructions, when executed by the one or more processors, cause the one or more processors to display, via a graphical user interface, exit information based on the at least one of the first exit command, the second exit command, or the third exit command.

Any of the non-transitory computer readable media above, further comprising instructions, when executed by the one or more processors, cause the one or more processors to transmit, to an autonomous drive system, exit information based on the at least one of the first exit command, the second exit command, or the third exit command in accordance with the exit command.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a road side unit in a network, comprising:
   receiving a plurality of requests, from a plurality of user equipments (UEs), to exit a parking area comprising a plurality of vehicles, wherein each of the plurality of UEs is associated with a corresponding vehicle of the plurality of vehicles;
   determining an estimated exit duration to exit the parking area from a current location for an individual vehicle of the plurality of vehicles;
   determining, based on the estimated exit duration, an exit order for the plurality of vehicles to exit the parking area;
   transmitting, to the plurality of UEs, a plurality of exit commands, based on the exit order, for the plurality of vehicles to exit the parking area;
   collecting, via one or more sensors, sensor information corresponding to activity within the parking area, the collecting comprising:
      monitoring the plurality of vehicles exiting the parking area; and
      detecting at least one of an out-of-order exit, a collision, a pedestrian, or other road user;
   generating, based on the sensor information, one or more updated exit commands to supersede the plurality of exit commands; and
   transmitting the one or more updated exit commands to at least a subset of the plurality of UEs in response to detecting the at least one of the out-of-order exit, the collision, the pedestrian, or the other road user.

2. The method of claim 1, wherein receiving the plurality of requests comprises:
   receiving an emergency exit request from a first responder vehicle of the plurality of vehicles; and
   wherein determining the exit order comprises prioritizing the first responder vehicle in the exit order for the plurality of vehicles.

3. The method of claim 1, wherein determining the exit order comprises:
   determining the exit order based on one or more of a reception order associated with receiving the plurality of requests, proximities of the plurality of vehicles to one or more exits of the parking area, sizes of the plurality of vehicles, maneuverabilities of the plurality of vehicles, estimated durations for the plurality of vehicles to exit the parking area, estimated fuel consumptions of the plurality of vehicles, or priorities associated with the plurality of requests.

4. The method of claim 1, wherein transmitting the plurality of exit commands comprises:
   sequentially transmitting each of the plurality of exit commands based on a corresponding scheduled exit time of a plurality of scheduled exit times in accordance with the exit order.

5. The method of claim 1, wherein transmitting the plurality of exit commands comprises:
   transmitting a first exit command of the plurality of exit commands to a first vehicle of the plurality of vehicles scheduled to exit the parking area before remaining vehicles of the plurality of vehicles; and
   transmitting, to the remaining vehicles, remaining exit commands of the plurality of exit commands each comprising identification information associated with a vehicle scheduled to exit the parking area immediately before each of the remaining vehicles.

6. The method of claim 5, wherein:
   the identification information includes at least one of a make, a model, a color, a license plate, a build, a location, or a vehicle type.

7. The method of claim 1, wherein transmitting the plurality of exit commands comprises:
   transmitting a plurality of scheduled exit times.

8. The method of claim 1, wherein:
   the plurality of exit commands comprises location information associated with one or more exits of the parking area.

9. A road side unit, comprising:
   a memory comprising instructions;
   a transceiver; and
   one or more processors operatively coupled with the memory and the transceiver, the one or more processors configured to execute the instructions in the memory to:
      receive a plurality of requests, from a plurality of user equipments (UEs), to exit a parking area comprising a plurality of vehicles, wherein each of the plurality of UEs is associated with a corresponding vehicle of the plurality of vehicles;
      determine an estimated exit duration to exit the parking area from a current location for an individual vehicle of the plurality of vehicles;
      determine, based on the estimated exit duration, an exit order for the plurality of vehicles to exit the parking area;
      transmit, to the plurality of UEs, a plurality of exit commands, based on the exit order, for the plurality of vehicles to exit the parking area;
      collect, via one or more sensors, sensor information corresponding to activity within the parking area, wherein to collect, the one or more processors are configured:
         monitor the plurality of vehicles exiting the parking area; and
         detect at least one of an out-of-order exit, a collision, a pedestrian, or other road user;
      generate, based on the sensor information, one or more updated exit commands to supersede the plurality of exit commands; and
      transmit the one or more updated exit commands to at least a subset of the plurality of UEs in response to detecting the at least one of the out-of-order exit, the collision, the pedestrian, or the other road user.

10. The road side unit of claim 9, wherein receiving the plurality of requests comprises:
    receive an emergency exit request from a first responder vehicle of the plurality of vehicles; and wherein determining the exit order comprises prioritizing the first responder vehicle in the exit order for the plurality of vehicles.

11. The road side unit of claim 10, wherein determining the exit order comprises:
determine the exit order based on one or more of a reception order associated with receiving the plurality of requests, proximities of the plurality of vehicles to one or more exits of the parking area, sizes of the plurality of vehicles, maneuverabilities of the plurality of vehicles, estimated durations for the plurality of vehicles to exit the parking area, estimated fuel consumptions of the plurality of vehicles, or priorities associated with the plurality of requests.

12. The road side unit of claim 10, wherein transmitting the plurality of exit commands comprises:
sequentially transmit each of the plurality of exit commands based on a corresponding scheduled exit time of a plurality of scheduled exit times in accordance with the exit order.

13. The road side unit of claim 10, wherein transmitting the plurality of exit commands comprises:
transmit a first exit command of the plurality of exit commands to a first vehicle of the plurality of vehicles scheduled to exit the parking area before remaining vehicles of the plurality of vehicles; and
transmit to the remaining vehicles, remaining exit commands of the plurality of exit commands each comprising identification information associated with a vehicle scheduled to exit the parking area immediately before each of the remaining vehicles.

14. The road side unit of claim 13, wherein:
the identification information includes at least one of a make, a model, a color, a license plate, a build, a location, or a vehicle type.

15. The road side unit of claim 10, wherein transmitting the plurality of exit commands comprises:
transmit a plurality of scheduled exit times.

16. The road side unit of claim 10, wherein:
the plurality of exit commands comprises location information associated with one or more exits of the parking area.

17. A method of wireless communication by a user equipment (UE) associated with a vehicle in a network, comprising:
transmitting, to a road side unit (RSU), an exit request; and
receiving, from the RSU based on an estimated exit duration to exit a parking area from a current location, one or more exit commands comprising identification information associated with an other vehicle scheduled to exit the parking area immediately before the vehicle, and one or both of an indication for the vehicle to begin exiting the parking area or a scheduled exit time for the vehicle.

18. The method of claim 17, wherein transmitting the exit request comprises:
transmitting an emergency exit request from a first responder vehicle; and
wherein receiving the one or more exit commands comprises receiving a priority exit command to exit the parking area ahead of a plurality of vehicles.

19. The method of claim 17, wherein:
the identification information includes at least one of a make, a model, a color, a license plate, a build, an identifying mark, or an accessory associated with the other vehicle.

20. The method of claim 17, further comprising:
displaying via a graphical user interface, exit information based on one or more exit commands.

21. The method of claim 17, further comprising:
transmitting, to an autonomous drive system, exit information based on the one or more exit commands.

22. A user equipment (UE) associated with a vehicle, comprising:
a memory comprising instructions;
a transceiver; and
one or more processors operatively coupled with the memory and the transceiver, the one or more processors configured to execute instructions in the memory to:
transmit, to a road side unit (RSU), an exit request; and
receive, from the RSU based on an estimated exit duration to exit a parking area from a current location, one or more exit commands comprising identification information associated with an other vehicle scheduled to exit the parking area immediately before the vehicle, and one or both of an indication for the vehicle to begin exiting the parking area or a scheduled exit time scheduled for the vehicle.

23. The UE of claim 22, wherein transmitting the exit request comprises:
transmitting an emergency exit request from a first responder vehicle; and
wherein receiving the one or more exit commands comprises receiving a priority exit command to exit the parking area ahead of a plurality of vehicles.

24. The UE of claim 22, wherein:
the identification information includes at least one of a make, a model, a color, a license plate, a build, an identifying mark, or an accessory associated with the other vehicle.

25. The UE of claim 22, wherein the one or more processors are further configured to:
display, via a graphical user interface, exit information based on the one or more exit commands.

26. The UE of claim 22, wherein the one or more processors are further configured to:
transmit, to an autonomous drive system, exit information based on the one or more exit commands.

* * * * *